PULSE SIGNAL TRANSLATING APPARATUS

Filed Dec. 31, 1954 2 Sheets-Sheet 1

INVENTOR.
GENUNG L. CLAPPER
BY
Dewey J. Cunningham
ATTORNEY 2,838,689
Patented June 10, 1958

2,838,689

PULSE SIGNAL TRANSLATING APPARATUS

Genung L. Clapper, Vestal, N. Y., assignor to International Business Machines Corporation, New York, N. Y., a corporation of New York Application December 31, 1954, Serial No. 479,133

3 Claims. (Cl. 307—88.5)

The present invention relates to a pulse signal translation apparatus and more particularly to such an apparatus for obtaining the delayed complement of a serial train of input pulses.

An object of the invention is to furnish an improved pulse signal translating circuit.

Another object of this invention is to furnish an improved delay device.

Still another object is to provide a circuit for producing a serial train of output pulses which is the delayed complement of a serial train of input pulses.

A further object of the present invention is to provide a circuit which receives a train of input pulses and produces a train of output pulses which is the complement of the train of input pulses delayed a predetermined time duration.

A still further object of this invention is to furnish improved pulse signal translation apparatus for translating an input which is in a binary system of notation into the complement thereof which is delayed by substantially one sync pulse time.

Other objects of the invention will be pointed out in the following description and claims and illustrated in the accompanying drawings, which disclose, by way of examples, the principle of the invention and the best mode, which has been contemplated, of applying that principle.

Figure 1:
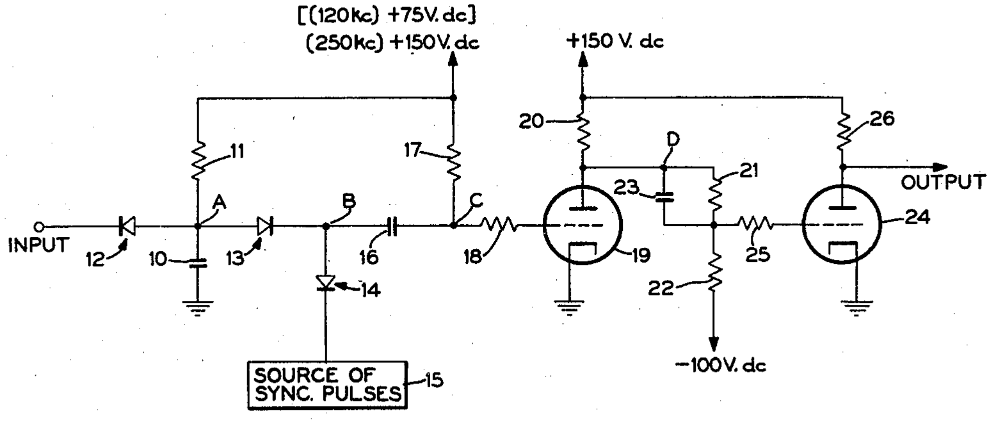
Fig. 1 is a schematic diagram of an illustrative embodiment of the present invention.

Serial digital computing devices normally deal with trains of discrete pulses which may be coded in a manner to form words of information. Each word may include a predetermined number of bits, a bit being a basic information unit. There are two forms of bits in the binary system of notation, a "1" and a "0." Some type of synchronizing means is usually furnished to assure that the bits of information are substantially equally spaced in time. The binary "1" is usually represented by a discrete pulse at the bit time and a binary "0" is represented by the absence of a pulse at the bit time.

In processing words of information, loading in various elements may causse each bit of a word to lag behind the synchronizing means as it passes through successive elements of the computer. Suppose, for example, it is desired to add a word of information which has passed through a number of circuits and now lags the synchronizing means by a certain amount with a word which has passed through a number of circuits and now lags the synchronizing means by a different amount. It will be apparent that the words must be re-synchronized so that they are in synchronism with each other and with the synchronizing means. Should it be desired to subtract the two words, a simple way is to add one word with the complement of the other word. The present invention is devoted to the end of producing the complement of a word such that the complement is delayed by one bit or synchronizing time interval. The synchronized delayed complement may then be added to another word which has been synchronized and delayed by substantially one bit time to produce an output which represents the difference between the two words. The present invention relates only to the production of the delayed complement of a train of input pulses.

Briefly, the present invention comprises a capacitor connected to a potential source through a suitable resistor so that with the proper time constant and appropriate supply voltage of a first polarity, the incremental change in voltage across the capacitor will reach a predetermined value within a predetermined time. Input signals are supplied through a gate diode effective to pass pulses of a second polarity. A gate diode arranged to pass pulses of said first polarity is connected between the capacitor and a point which is also connected to receive synchronizing pulses of said second polarity through a properly arranged gate diode. The potential at said point is capacitatively coupled to a terminal which is clamped to a predetermined level. The input line is normally at some potential level of said first polarity. When the synchronizing pulses are being supplied to the circuit, the voltage across the capacitor varies between substantially zero and the said potential level on the input line, and the output voltage consists of pulses of said second polarity which occur in synchronism with the synchronizing pulses. When input pulses of said second polarity occur, the voltage across the capacitor swings between said first polarity and said second polarity, the voltage across the capacitor being pulled to the second polarity side of zero volts by the input pulses. The charging rate of the capacitor is such that the voltage across it will come to zero volts during the time for one synchronizing pulse following an input pulse, but cannot return to said first polarity to produce an output pulse. Therefore, the output pulse train will accordingly be the complement of the input pulse train, delayed by substantially one synchronizing pulse time.

Figure 2:
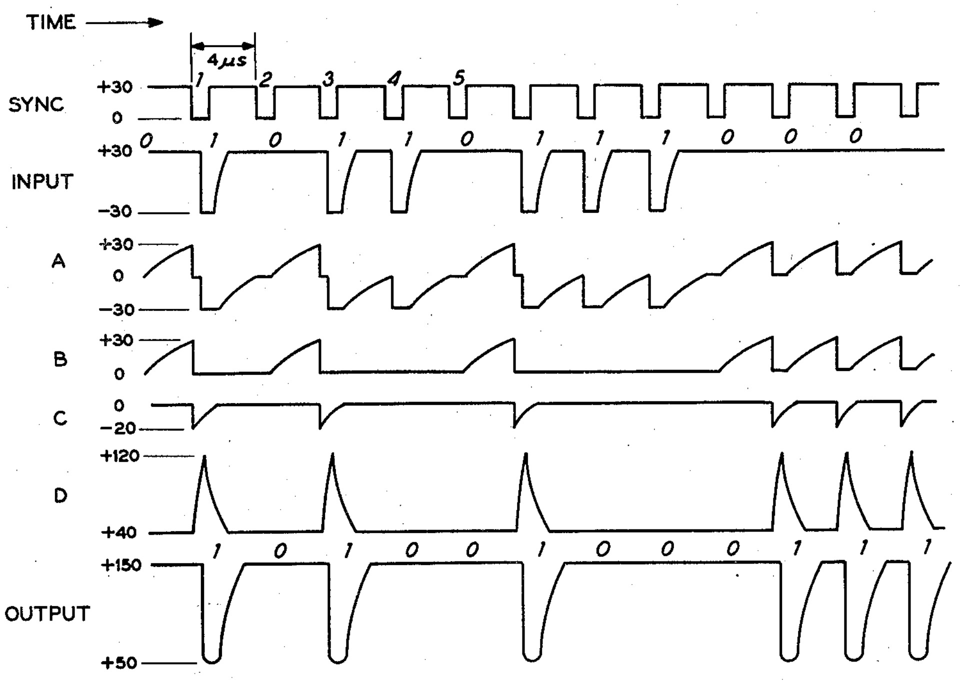
Fig. 2 shows a series of sample wave forms at different points in the circuit of Fig. 1 for an illustrative input train of pulses.

For a more detailed understanding of the invention, reference is made to Fig. 1 which shows an illustrative embodiment of the present invention. Fig. 2 shows wave forms produced at different points in Fig. 1 for a sample input. A capacitor 10 has one plate thereof connected to ground and the other plate thereof connected through a resistor 11 to a positive source of D. C. potential. This source of potential is chosen according to the frequency of the synchronizing pulses. For example, with a frequency of 250 kc., a source of +150 v. D. C. may be used and with a frequency of 120 kc., a source of +75 v. D. C. may be used. The time constant of the arrangement is such that a predetermined incremental change in voltage will appear across the capacitor within a predetermined time interval. The input pulses may be in the form of negative pulses as shown in Fig. 2 obtained from some suitable source. These pulses are applied to the cathode of diode 12, the plate of said diode being connected to junction point A between capacitor 10 and resistor 11. Junction point A is connected to the plate of a diode 13, the cathode of said diode being connected to junction point B. A source of synchronizing pulses, illustrated in block form and identified by reference numeral 15, is connected to the cathode of a diode 14, the plate of said diode being connected to junction point B. Capacitor 16 is used to couple junction points B and C. A resistor 17 connects junction point C to the positive D. C. source of potential and a resistor 18 connects junction point C to the control grid of a triode 19. The cathode of triode 19 is connected to ground and the plate is coupled through a resistor 20 to a positive source of D. C. potential, herein illustrated as +150 v. D. C. The plate of triode 19 is also connected to a junction point D which is the high end of a voltage divider comprising serially connected resistors 21 and 22 and a capacitor 23 in shunt with resistor 21. The low end of resistor 22 is connected to a negative source of D. C. potential, herein illustrated as −100 v. D. C. The junction point between resistors 21 and 22 is connected to the control grid of a triode 24 through a current limiting resistor 25. The cathode of triode 24 is connected to ground and the plate thereof is connected through a resistor 26 to the +150 v. D. C. potential. The output is taken from the plate of triode 24.

The circuit shown in Fig. 1 has been designed to work with negative input pulses and the circuit description will be in line therewith. Typical values of the circuit components may be as follows:

Capacitor 10=100 micro-mcrofarads
Resistor 11=120 kilohms
Capacitor 16=39 micro-microfarads
Resistor 17=330 kilohms
Resistor 18=1 kilohm
Resistor 20=27 kilohms
Resistor 21=200 kilohms
Resistor 22=300 kilohms
Capacitor 23=39 micro-microfarads
Resistor 25=10 kilohms
Resistor 26=15 kilohms
Triodes 19 and 24 may be a dual triode, type 6211.

The wave forms shown in Fig. 2, which are descriptive of the voltages appearing at different points in the circuit shown in Fig. 1, have voltage references based on the component values set forth above. It should be understood, however, that the present invention is not limited to the use of these specific values, as other suitable values could be chosen.

The operation of the present invention will now be described in detail. Reference should be made to the wave forms in Fig. 2 in order to better understand the action of the various components. The input level is normally +30 volts which allows junction A to rise to this level as capacitor 10 is charged through resistor 11. For operation at 250 kc., resistor 11 is connected to +150 v. D. C. A lower voltage is used for operation at lower frequencies, for example, +75 v. D. C. for 120 kc. As point A rises above zero volts, current flows from junction point A to junction point B through diode 13. This causes a rise in voltage at junction point B. Junction point C is prevented from rising by the diode action of the positive grid of the conducting triode 19 so that a charge appears across capacitor 16. Junction point D is down to +40 volts, since triode 19 is conducting, and keeps triode 24 cut off. Thus, the plate output of triode 24 is at +150 volts. These are the initial conditions as indicated at the very beginning of the descriptive wave forms shown in Fig. 2.

The first sync pulse reduces the voltage at junction points A and B from +30 volts to zero volts. The negative going pulse at junction point B is transmitted to junction point C through coupling capacitor 16. This cuts off triode 19 and junction point D rises sharply towards +150 volts. This positive going pulse is transmitted through bypass capacitor 23 to the control grid of triode 24 and causes it to conduct. As a result of this series of events, the output falls sharply from +150 volts to +50 volts. After about one micro-second (for 250 kc. operation) junction point C rises to a level where conduction begins in the input triode 19 and junction point D returns to the original +40 volt level. This negative going pulse cuts off the output triode 24 which allows the output to rise to the +150 volt level. This completes the negative pulse at the output which represents a binary "1" as a result of the binary "0" entry (initial condition).

Just after the beginning of the first sync pulse, a negative going pulse from +30 volts to −30 volts appears at the input. This pulse represents a binary "1" input. Current flows from junction point A to the input so that junction point A drops to −30 volts. Junction point B is "disconnected" from the change in voltage at point A from zero volts to −30 volts by the reversal of polarity across diode 13 which connects junction points A and B. At the end of the input pulse, the input rises to +30 volts and junction point A is now free to rise as current flows through resistor 11 from the +150 v. D. C. source. The time constant is such that junction point A will rise to zero volts just before the second sync pulse. There is no output resulting from this second sync pulse, since the voltage at point B does not change at this time. Thus, there is provided a binary "0" output as a result of the binary "1" input during the previous sync pulse.

Since the input is a binary "0" during the second sync pulse, junction point A rises to +30 volts and the third sync pulse produces a negative pulse representing a binary "1" as has been previously described. This action continues with each succeeding sync pulse and a pattern of pulses appears at the output which is the complement of the input pulse pattern but delayed by substantially one bit time. Notice that with a binary input of 010110111000, the one bit delayed complement output is 101001000111.

It will be noted that the complementary output pattern is generated at junction point C. Triodes 19 and 24 and their associated circuitry serve only to amplify and shape the output pulse. Many other output devices are possible. For example, a cathode follower stage driven from point D through a suitable divider would produce positive going pulses at any desired level. Any voltage amplifying device could be used at junction point C such as a transistor amplifier.

Figure 3:
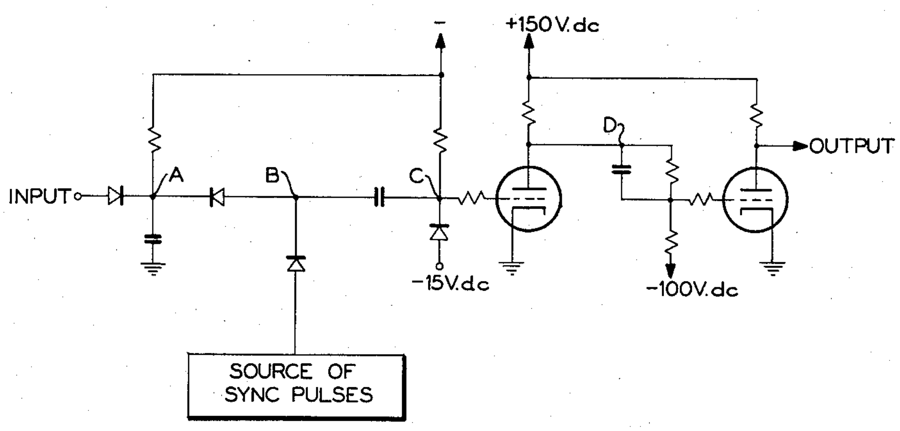
Fig. 3 is a schematic diagram showing a modification of the embodiment illustrated in Fig. 1.

While the present invention has been illustrated and described as being adapted to receive negative input pulses, it should be understood that with a slight reversal of parts the circuit could receive positive pulses. To accept a train of positive pulses and provide the delayed complement thereof it is but necessary to reverse the polarity of the D. C. potential used to charge capacitor 10, reverse the plate and cathode connections of diodes 12, 13 and 14, and provide positive synchronizing pulses. In order to properly clamp point C so that it does not follow points A and B when they drop in potential from zero to −30 volts, it is necessary to provide a diode with its cathode connected to point C and its plate connected to some intermediate source of negative potential such as −15 v. D. C. The above modifications may be seen in Fig. 3.

It should also be understood that the present invention is not limited in operation to the frequencies listed. Lower or higher frequencies may be used with respectively lower or higher reference voltages. Also, the reference voltage of +150 v. D. C., by way of example, could be kept constant and the value of capacitor 10 changed for different frequencies. As the frequency increases, the value of capacitor 10 decreases and vice versa. The same is true for resistor 11. Also, both resistor 11 and capacitor 10 may be varied as long as the proper time constant is furnished for a given frequency.

It has been previously stated that the present invention can receive a first train of pulses from one section of a computer and provide the complement thereof, delayed by substantially one bit, to an adder. This adder may be of the binary type. A second train of pulses from a different section of the computer may be connected through a suitable delay unit, which is synchronized with the present complementary delay unit, to the adder. Thus, the output from the adder becomes the difference between the first and second trains of pulses. The delay unit used may be of the type shown and described in co-pending application Serial No. 346,938 for Synchronized Electronic Delay Line filed by G. L. Clapper on April 6, 1953, now Patent No. 2,801,334, dated July 30, 1957, and assigned to the same assignee as the present invention.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse signal translating circuit comprising a capacitor having one side referenced with respect to ground and the other side connected to a first junction point, a first gate connected to said first junction point and adapted to receive a train of input pulses, means connected to said first junction point to change the potential thereof toward the inactive level of said input pulses so that said potential changes an incremental amount during a given interval of time, said first gate being arranged to rapidly bring the potential at said first junction point to the active level of the input pulses during an input pulse, a second junction point connected to said first junction point by a second gate arranged to conduct when said first junction point reaches a predetermined reference level, a source of synchronizing pulses having an inactive level substantially identical with the inactive level of said input pulses and an active level substantially identical with said predetermined reference level, said second gate being arranged so as to disconnect said source of synchronizing pulses from said second junction point as long as said second junction point has not reached said predetermined reference level and to rapidly return said second junction point to said predetermined reference level during the active portion of the synchronizing pulse if said second junction point has gone beyond said predetermined reference level, a third junction point coupled to said second junction point by capacitor means, means for clamping said third junction point so that an excursion of the potential at said second junction point beyond said predetermined potential toward said inactive input reference level will produce a change in the potential across said capacitor means, the last-named potential being effective to produce a change in potential at said third junction point when the second junction point is restored to said predetermined reference level by the synchronizing pulse, and means for restoring said third junction point to said predetermined reference level.

2. A pulse signal translating circuit comprising a capacitor having one side thereof connected to a reference potential and the other side thereof connected to a first junction point, a second junction point connected by a first gate to said first junction point, a second gate connected to said first junction point adapted to receive a train of input pulses which have an excursion from an inactive level across a predetermined reference level to an active level, a third gate connected to said second junction point adapted to receive synchronizing pulses which have an excursion from an inactive level substantially identical with the inactive level of said input pulses to an active level substantially identical with said predetermined reference level, means for changing the potential at said first junction point toward the inactive level of said input pulses an incremental amount in a given interval of time, the potential at said junction point changing from the active level of said input pulses to said predetermined reference level between synchronizing pulses if an input pulse has just occurred and from said predetermined reference level to said inactive input level if an input pulse has not just occurred, said second gate allowing said input pulses to rapidly change the potential at said first junction point to the active level of said input pulses upon the occurrence of an input pulse, said first gate and said third gate allowing said synchronizing pulses to rapidly return the potential at said first and second junction points to said predetermined reference level if their potential is beyond said predetermined reference potential toward the inactive level of said synchronizing pulses, a third junction point coupled to said second junction point by capacitor means, clamping means connected to said third junction point for preventing a change in potential thereof when said second junction point goes beyond said predetermined reference potential and thereby places a potential across said capacitor means, the last-named potential being effective to produce a change in potential at said third junction point when the second junction point is returned to said predetermined reference potential by a synchronizing pulse, and means for restoring said third junction point to said predetermined reference level during the time of the synchronizing pulse.

3. A pulse signal translating circuit comprising a capacitor having one side referenced with respect to ground and the other side connected to a first junction point, a first gate connected to said first junction point and adapted to receive a train of input pulses each having an excursion from an inactive level at a first reference potential to an active level at a second reference potential, said first gate being arranged to allow the input pulses to rapidly change the potential at said first junction point to said second reference potential, a source of synchronizing pulses each having an excursion from said first reference potential to a third reference potential intermediate said first and second reference potential, a second junction point connected to said first junction point by a second gate, a third gate connecting said source of synchronizing pulses to said second junction point, means connected to said first junction point for changing the potential thereon in the interval between said synchronizing pulses from said second reference potential to said third reference potential if an input pulse has immediately preceded the change or from said third reference potential to said first reference potential if an input pulse has not immediately preceded the change, said second gate being so arranged that said second junction point will follow said first junction point when the potential on said first junction point is between said third reference potential and said first reference potential, said third gate being arranged such that each synchronizing pulse will rapidly restore the potential at said first and second junction points to said third reference potential in the event the lack of an input pulse allowed said first and second junction points to change to said first reference potential immediately preceding a synchronizing pulse, a third junction point coupled to said second junction point by capacitor means, means for clamping said third junction point to said third reference potential so that the last-named change in potential at said second junction point produces a potential across said capacitor means, the last-named potential being effective to produce a pulse at said third junction point when said second junction point is restored to said third reference potential by the synchronizing pulse, the pulses produced at said third junction point representing the complement of said input pulses delayed by substantially one synchronizing pulse period.

References Cited in the file of this patent

UNITED STATES PATENTS

| | | |
|---|---|---|
| 2,618,753 | Mierlo | Nov. 18, 1952 |
| 2,685,039 | Scarbrough et al. | July 27, 1954 |
| 2,760,160 | Flood et al. | Aug. 21, 1956 |
| 2,764,688 | Grayson et al. | Sept. 25, 1956 |